ANALOG TO DIGITAL ANGLE CONVERTER

Filed June 19, 1963 2 Sheets-Sheet 1

INVENTOR.
Gale R. Grabow
BY
Paul J. Ethington
ATTORNEY

ANALOG TO DIGITAL ANGLE CONVERTER

Filed June 19, 1963 2 Sheets-Sheet 2

INVENTOR.
Gale R. Grabow
BY
Paul J. Etkington
ATTORNEY

United States Patent Office 3,299,420

Patented Jan. 17, 1967

3,299,420
ANALOG TO DIGITAL ANGLE CONVERTER

Gale R. Grabow, Clearwater, Fla., assignor to General Motors Corporation, Detroit, Mich., a corporation of Delaware Filed June 19, 1963, Ser. No. 288,952
3 Claims. (Cl. 340—347)

This invention relates to a transducer for producing digital information relating to the displacement of a movable member and, more particularly, to an electro-optical device for providing digital signals which occur at a rate related to the displacement of, for example, a rotating shaft.

There are many instances in which it is desired to indicate the position or change of position of a linearly or angularly displaceable member by means of digital signals. An example of such an instance is where it is desired to convert the angular position of the output shaft of, for example, an accelerometer into digital signals which may be processed by a computer. The present invention relates to a transducer for providing such digital information by movement of a shutter about a light source to interrupt the transmission of light to a plurality of photosensitive devices, such as photovoltaic cells.

In accordance with the present invention, a light source is surrounded by a symmetrical arrangement of photovoltaic cells which are adapted to produce electrical signals in accordance with the amount of light incident thereon. Shutter means are provided to be rotated about the light source intermediate the source and the photo-voltaic cells to interrupt the transmission of light to the individual cells over a portion of the angular path of the shutter means. The shutter means is adapted to be interconnected with a linearly or angularly displaceable member either directly or through suitable transmission means to be rotated thereby. Consequent rotation of the shutter means produces variations in the output signals of the photovoltaic cells at a rate of occurrence dependent upon the displacement of the shutter means and, thus, also dependent upon the angular displacement of the member. By connecting the photocells which are positioned on symmetrically opposite sides of the source into electrically opposing pairs, each pair of photo-voltaic cells is effective to produce a net output signal which varies between two signal levels of distinct character in accordance with rotation of the shutter means. The net output of the cell pairs may be connected into a suitable means which is responsive to the changes between the distinct levels of the net output signals to produce a digital signal for each change.

A particular and preferred embodiment of the invention contemplates the use of two pairs of photo-voltaic cells arranged on perpendicular axes about the light source and connected in electrical opposition, and a semi-cylindrical shutter which is rotated about an axis which is mutually perpendicular to the cell arrangement axes to provide two phase-shifted waveforms which alternately vary in character with each 90° of displacement of the shutter means.

A more complete understanding of the invention may be obtained by reference to the following specification which is to be taken with the accompanying drawings of which:

Figure 1:
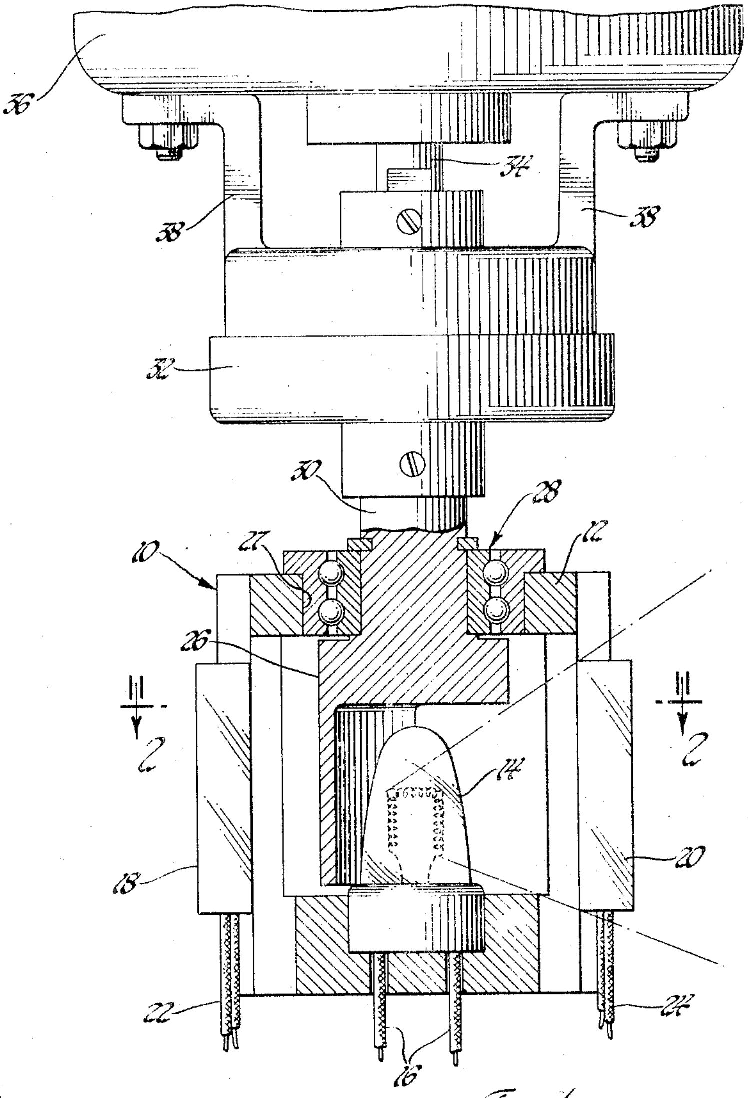
FIGURE 1 shows, partly in cross-section, an illustrative embodiment of the invention.

Referring now to FIGURE 1, the transducer 10 including a housing 12 is shown in cross-section to reveal an internally mounted incandescent lamp 14. The lamp 14 is mounted centrally of the housing 12 and on the longitudinal centerline thereof. Lamp 14 is adapted to be connected to a source of energizing current by means of conductors 16 which exit from the interior of the housing 12 through the bottom thereof as shown. Lamp 14 is adapted to produce light in a spherical pattern; that is, of uniform intensity in substantially all directions. Suitably mounted on opposite lateral walls of the housing 12 is a pair of photo-voltaic cells 18 and 20 which are adapted to produce a small E.M.F. when irradiated by the lamp 14. When suitably chosen the cells 18 and 20 are adapted to produce a short circuit current which is directly proportional to the area upon which light is incident. These cells are commonly known as solar cells and are available from the Hoffman Electronics Corporation of El Monte, California, under the designation 55C. The output E.M.F. of the photo-voltaic cells 18 and 20 appears across respective pairs of conductors 22 and 24 which may be interconnected with subsequent circuitry as described in the following. The transducer 10 also includes a semi-cylindrical shutter 26 of opaque material which is rotatably mounted in a central bore 27 through the top of the housing 12 and along the centerline. The rotatable mounting of the shutter 26 may be readily acomplished with suitable bearing means 28. When so mounted the shutter 26 is adapted to be rotated laterally about the lamp 14 and intermediate the lamp and the cells 18 and 20 so as to interrupt the transmission of light from the lamp 14 to the cells at a rate corresponding to the rate of angular displacement of the shutter 26. As shown, the angular path which is described by semi-circular shutter 26 is centered on the centerline of the housing 12 and lamp 14.

As previously indicated, the transducer 10 is adapted for connection to a displaceable member such that displacement of the member results in rotation of shutter 26. To accomplish this the upper shaft portion 30 of shutter 26 is connected through a variable ratio gear box 32 to a rotatable shaft 34. The shaft 34 is here represented as the output shaft of a motor 36 to which the gear box 32 is suitably mounted by means of the legs 38. The variable ratio gear box 32 is effective to allow the ratio between the rate of angular displacement of shaft 34 and the angular displacement of the shaft 30 of the shutter 26 to be varied over any desired range. As will be subsequently apparent, the gear box 32 will usually be employed to step up the shaft rotation so as to increase the resolution in the digital information which is provided by the present invention.

Figure 2:
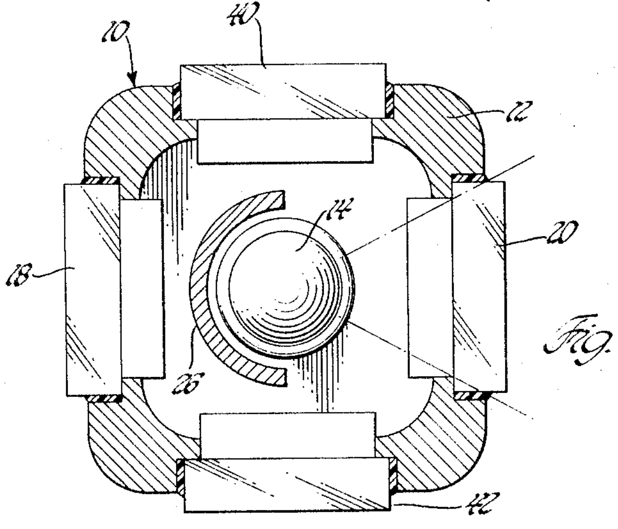
FIGURE 2 is a cross-sectional view taken along a line 2—2 of FIGURE 1.

Referring to FIGURE 2, the nature of the transducer 10 is indicated in greater detail. FIGURE 2 shows an additional pair of photo-voltaic cells 40 and 42 which are symmetrically positioned on opposite sides of the lamp 14. FIGURE 2 clearly indicates that the axis upon which cells 18 and 20 are located is perpendicular to the axis upon which cells 40 and 42 are located and intersects therewith at the longitudinal centerline of the housing 12. The photovoltaic cells may be mounted in the housing in suitably provided apertures with an epoxy cement. FIGURE 2 shows the position of the semi-cylindrical shutter 26 to be such that cell 18 is completely shielded from the lamp 14. However, cell 20, completely unshielded and totally illuminate by lamp 14, produces maximum short circuit current. Cells 40 and 42, on the other hand, are partly shielded from lamp 14 and, thus, produce approximately one half of their maximum short circuit current. It is clear that imparting rotational motion to the shutter 22 is effective to gradually diminish the illuminated area of each of the cells in order until a complete shielding effect is accomplished. This is followed by a gradual increase in the illuminated area until complete illumination is accomplished. This cycle will repeat for each of the cells each time the shutter 26 revolves.

Figure 3:
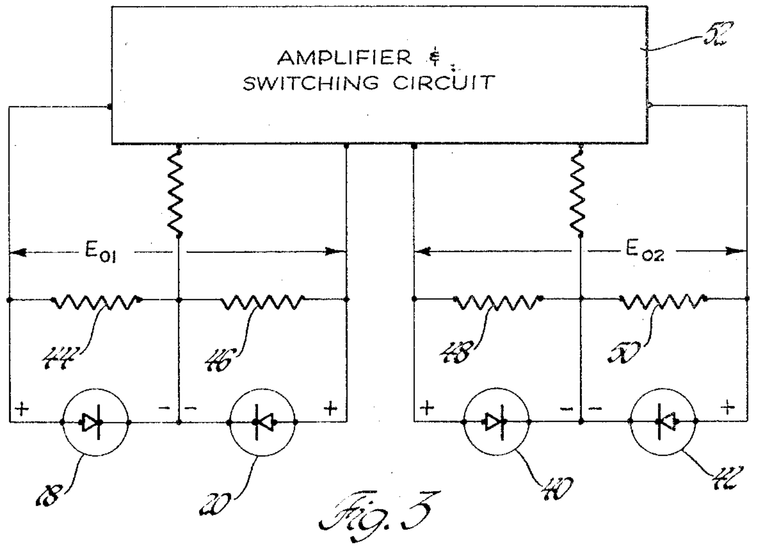
FIGURE 3 is an illustrative schematic circuit diagram of the electrical connections contemplated by the present invention.

Referring now to FIGURE 3, the invention is further carried out by connecting the symmetrically opposite pairs of cells in electrical opposition. Accordingly, cells 18 and 20 are connected to form a first opposing pair and cells 40 and 42 are connected to form a second opposing pair. Since the cells 18, 20, 40 and 42 are all substantially similar and are selected to produce approximately equal E.M.F.'s when equally illuminated, the net voltage produced by each of the photocell pairs 18, 20 and 40, 42 will alternately vary between two voltage levels of opposite polarity. The net voltage of each of the photo-voltaic pairs is represented by $E_0$. When, for example, as shown in FIGURE 2, photo-voltaic cell 18 is completely shielded while cell 20 is completely illuminated, the net voltage across the opposing pair of cells is of one polarity while a 180° turn of shutter 26 switches the output voltage to the opposite polarity. The polarity of $E_0$ goes through 0 when the opposing cells of a pair are equally illuminated. The output waveforms are more clearly shown in FIGURE 4.

Continuing with the description of FIGURE 3, a pair of shunt connected load resistors 44 and 46 are connected across photo-voltaic cells 18 and 20. Similarly, resistors 48 and 50 are connected across cells 40 and 42. The opposing cell pairs are further connected into the input channels of a double channel amplifier and switching circuit 52 which is connected to receive the net output voltages of the opposing pairs. The amplifier and switching circuit 52 may comprise a pair of Schmitt trigger circuits so as to be responsive to the individual changes in the polarity of the net voltages of the photocell pairs to produce digital signals in accordance therewith. The circuit 52 is not shown in detail since the particular nature thereof is variable to suit the requirements of the particular application.

Figure 4:
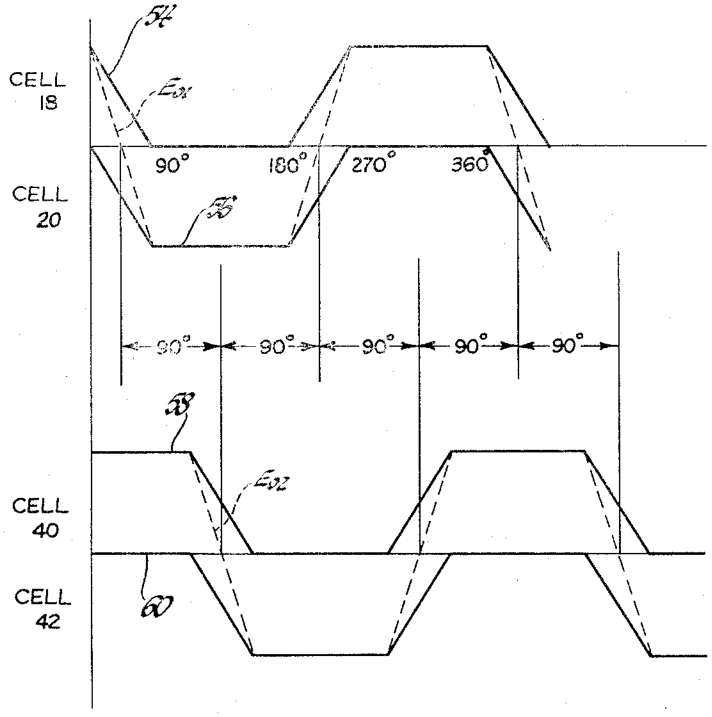
FIGURE 4 is a graph of electrical signal waveforms which are produced by the illustrative embodiment of the invention.

The operation of the invention may be more completely understood by reference to the waveforms of FIGURE 4. The output voltage from cell 18 is shown by plot 54 and assumes a trapezoidal shape which varies in amplitude with the angular rotation of the shutter 26. The output voltage of opposing cell 20 is shown by plot 56 to have a similar wave shape of opposite polarity and phase. The dotted line interconnecting curves 54 and 56 represents the net output voltage $E_{01}$ which is produced by cell pair 18, 20 upon rotation of shutter 26. In a similar fashion, the individual output voltages of cells 40 and 42 are indicated by curves 58 and 60 which are also of trapezoidal form. The net voltage $E_{02}$ is the sum of the curves 58 and 60 and is phase-shifted by 90° from the net output voltage $E_{01}$. As suggested in FIGURE 4, the net output voltages $E_{01}$ and $E_{02}$ alternately pass through 0 with each 90° of rotation of shutter 26. Accordingly, it is clear that the amplifier and switching circuit 52 must be of a nature which is responsive to the changes in polarity of the net voltages $E_{01}$ and $E_{02}$ to reverse in state and produce a digital signal output each time shutter 26 advances 90°. It is to be particularly noted that by means of the gear box 32 connecting the shaft 34 with the shutter 26, a high ratio of shutter displacement to shaft 34 displacement may be accomplished. Thus, a high resolution in the angular displacement of shaft 34 is available through the present invention.

Inoperation rotation of shaft 34 is effective to produce two phase-shifted waveforms of varying magnitude and polarity which trigger the amplifier and switching circuits 52 to produce digital signals upon predetermined degrees of advancement of the shaft 34. In practicing the invention the output consisting of digital signals from amplifier and switching circuit 52 may be suitably analyzed by a computer to provide information related to the position, speed or acceleration of the shaft 34. It is to be understood that the invention as here described is subject to modification as suits the particular application. However, for a definition of the invention, reference should be had to the appended claims.

What is claimed is:

1. Apparatus for providing digital information related to the displacement of a movable member comprising: a light source for radiating light in a substantially radial pattern about an axis through the source; a pair of photo-voltaic cells to produce output signals in accordance with the amount of light incident thereon and positioned on opposite sides of the source along a diameter through said axis so as to be within the pattern; shutter means including an essentially solid semicylindrical element of opaque material; mounted to be rotatable through a circular path about the axis and between the source and the photo-voltaic cells, the shutter means being mechanically connected to the movable member to be rotated about the source to interrupt the transmission of light to the cells at a rate dependent on the rate of displacement of the member, the element being of sufficient circumferential dimension to fully eclipse either of the cells, the cells being electrically connected in opposition whereby the net output signal of the pair of cells alternately varies between two signal levels of different character at a rate dependent upon the rate of angular displacement of the shutter means.

2. Apparatus as defined in claim 1, the combination further including means connected to receive the resultant outputs of the cell pairs and to produce a digital signal for each change in character of the outputs.

3. Apparatus as defined in claim 2 including variable ratio transmission means interconnecting the movable member and the shutter whereby the ratio of displacement of said member and shutter may be varied over a predetermined range.

References Cited by the Examiner

UNITED STATES PATENTS

| | | | |
|---|---|---|---|
| 2,431,591 | 11/1947 | Snyder et al. | 340—347 |
| 3,058,001 | 10/1962 | Dertouzos | 250—220 |
| 3,096,444 | 7/1963 | Seward | 340—347 |
| 3,207,121 | 9/1965 | Steiner | 340—347 |

MAYNARD R. WILBUR, *Primary Examiner.*

MALCOLM A. MORRISON, *Examiner.*

K. R. STEVENS, W. J. KOPACZ, *Assistant Examiners.*